May 1, 1956  J. D. STRONG  2,743,646
OPTICAL INSTRUMENT HAVING THROUGH-AND-RETURN LIGHT PATH
Filed May 17, 1952  3 Sheets-Sheet 1
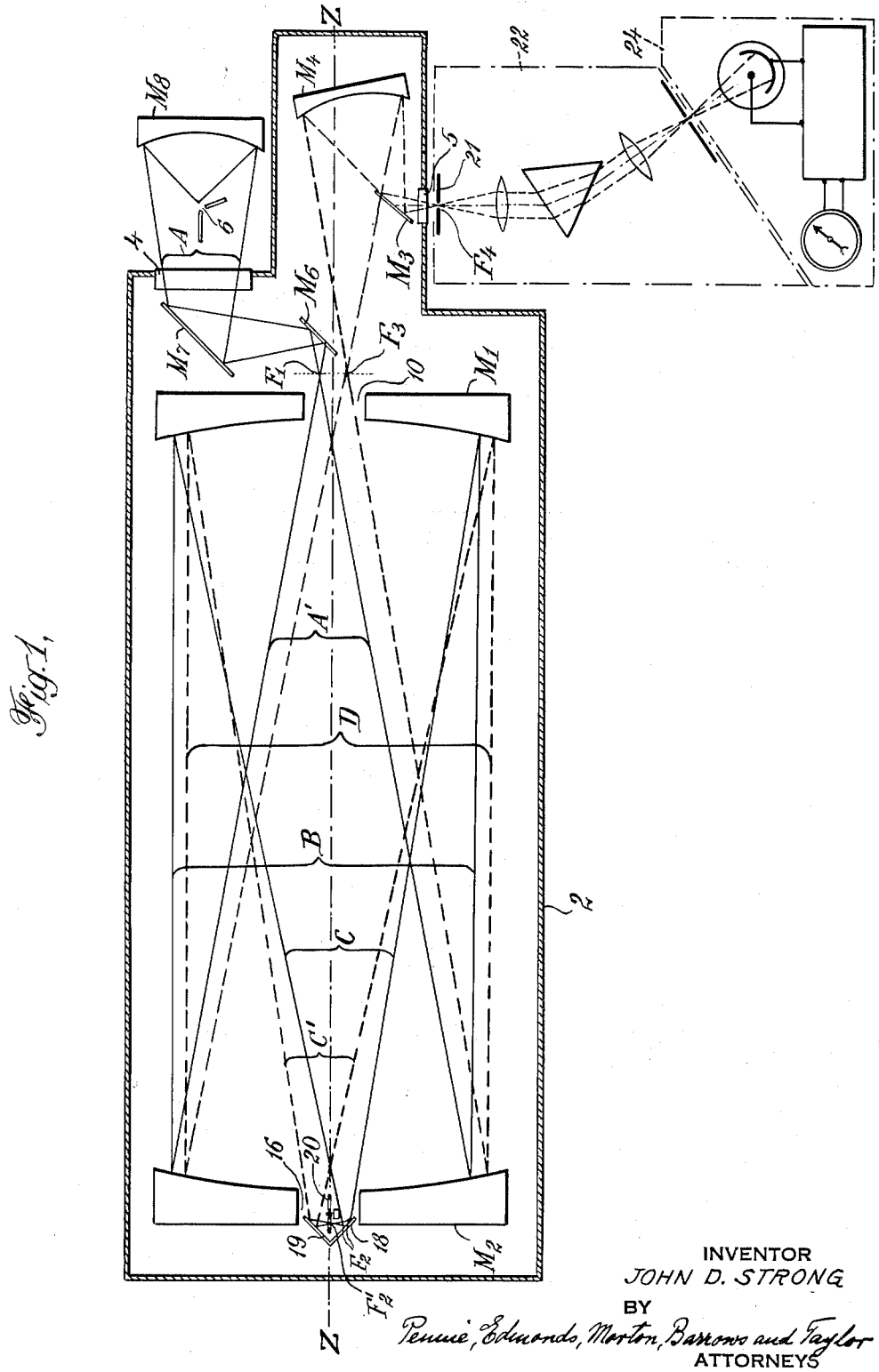
INVENTOR
JOHN D. STRONG
BY
Pennie, Edmonds, Morton, Barrows and Taylor
ATTORNEYS

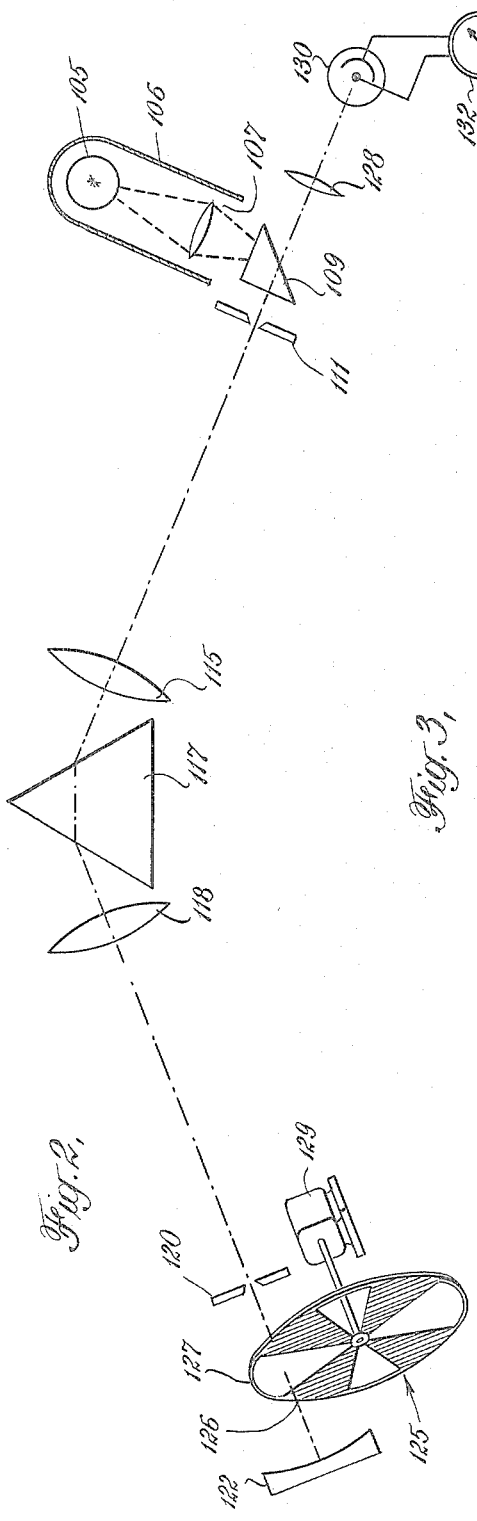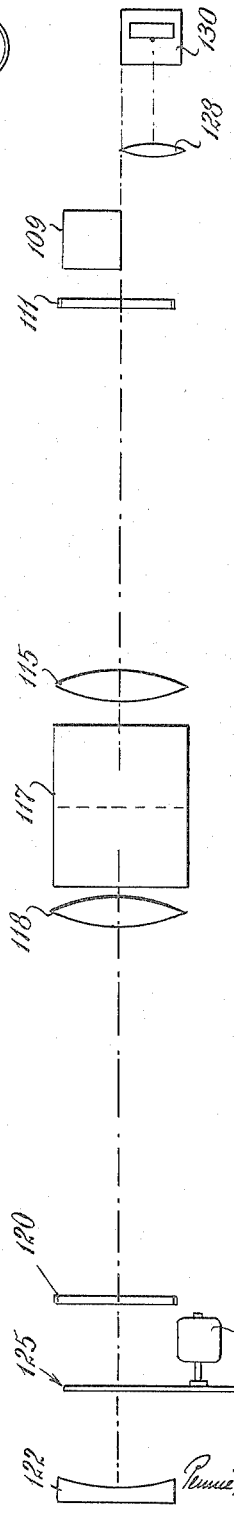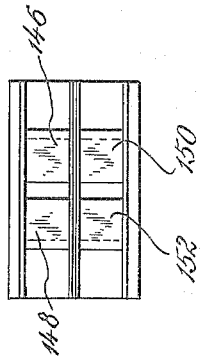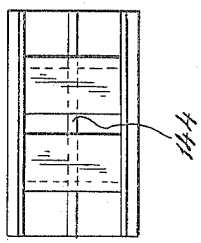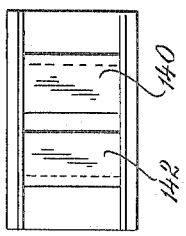

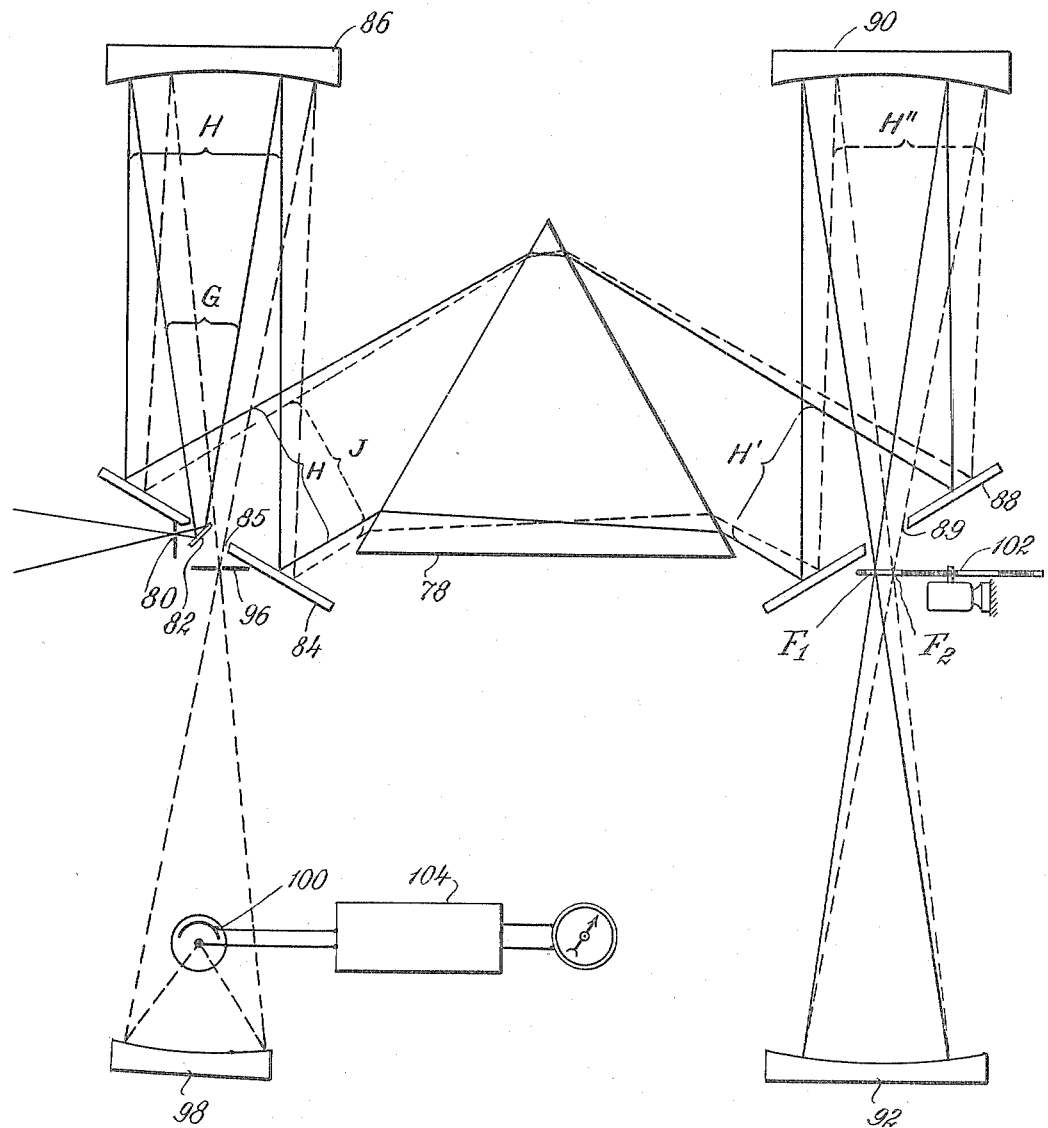

United States Patent Office 2,743,646
Patented May 1, 1956

2,743,646

OPTICAL INSTRUMENT HAVING THROUGH-AND-RETURN LIGHT PATH

John D. Strong, Baltimore, Md.

Application May 17, 1952, Serial No. 288,373

17 Claims. (Cl. 88—14)

This invention relates to optical instruments in which one or more imaging or dispersing elements are used more than once by light rays making "through-and-return" passes therethrough, i. e. by light rays passing through such elements at least twice in generally opposite directions, and in which means are provided to distinguish between the light which has gone through such elements a desired number of times and light which has not. According to the general method of the invention, the light is interrupted periodically at an appropriate point in its path between the input end of the instrument and two or more of its plural passages through the element in question, and a tuned detector is employed at the output end of the instrument to respond only to light interrupted at the periodic rate of the interrupting device. The invention has application in various instruments such as spectrometric devices. The present application is continuation-in-part of my copending application Serial No. 106,408, filed July 23, 1949, now abandoned.

The invention will now be described in terms of a number of preferred embodiments by reference to the accompanying drawings in which:

Fig. 1 is a diagram of an absorption cell according to the invention;

Fig. 2 is a plan view of one form of monochromator according to the invention;

Fig. 3 is a view in elevation of the monochromator of Fig. 2;

Figs. 4, 5 and 6 are views in elevation of various forms of entrance and exit aperture defining devices usable in the monochromator of Figs. 2 and 3; and Fig. 7 is a plan view of another form of monochromator according to the invention.

The absorption cell of Fig. 1 includes two concave spherical or paraboloidal mirrors $M_1$ and $M_2$ which serve as imaging elements to pass light from a source to a first image location over a path of desired length, reflecting means comprising plane mirrors 18 and 19 disposed as a corner reflector adjacent the first image of the source in $M_1$ and $M_2$ in position to return the light through $M_1$ and $M_2$ a second time to a final image location, appropriate optical elements to define the source and to utilize the light gathered at the final image, and a motor driven chopper 20 positioned adjacent the reflecting means to modulate the light returned from the first image to $M_1$ and $M_2$ so as to permit discrimination at the final image position by means of a tuned detector between the light which has traversed the entire prescribed path and that which has not. In Fig. 1 the light rays are shown in full lines between the input end of the instrument and the reflecting means, and in dotted lines between the reflecting means and the output end of the cell. A gas-tight envelope 2 may surround the whole. The mirrors $M_1$ and $M_2$ are apertured at 10 and 16 and are positioned with their concave surfaces facing each other so that the axis Z—Z which passes through their centers of curvature or foci, in the case of paraboloids, passes through the openings 10 and 16, preferably symmetrically. The separation of the mirrors is such that the focus of each on the line Z—Z lies outside of or in back of the other.

Light from a suitable source such as an a. c. 6 whose absorption in the gas of the cell is to be studied is gathered by a mirror $M_8$, which may be of paraboloidal form, and is sent into the cell through a window 4. The converging bundle A from $M_8$ is reflected at plane mirrors $M_7$ and $M_6$ to position its focus at $F_1$, close to but laterally displaced from the axis Z—Z. If desired of course, an entrance slit may be located at $F_1$. In either event, $F_1$ is effectively at the location of the source for $M_1$ and $M_2$. $F_1$ is distant from $M_2$ by the focal distance of $M_2$, so that the bundle A' diverging from $F_1$ is transformed by $M_2$ into a parallel bundle B. Bundle B is reflected at $M_1$ into a convergent bundle C converging toward a focus at $F_2$. Before reaching $F_2$ however, bundle C is reflected at the plane mirror 18 to a focus at $F'_2$, and the bundle C' diverging from $F'_2$ is further reflected at plane mirror 19 towards $M_1$, where it is transformed into a parallel bundle D, which is finally imaged by $M_2$ at $F_3$.

The chopper 20 interrupts at a periodic rate the passage of light between the mirrors 18 and 19. It hence effects periodic interruption of the light diverging from $F_1$ between its two passages through the imaging elements $M_1$ and $M_2$. The chopper may therefore also be positioned to intersect either or both of the bundles C and C' in the path between $M_1$ and mirrors 18 and 19.

The light diverging from $F_3$ may be refocused by mirrors $M_4$ and $M_5$ to pass through an exit window 5 for presentation at $F_4$, which may for example coincide with the entrance slit 21 of a monochromator 22. By using at the output of the monochromator a light sensitive detector 24 tuned to the frequency of the chopper 20, the observed response will be limited to that due to light which has passed within the cell six times the length of the separation between $M_1$ and $M_2$, excluding for example light which diverges from $F_1$ and which upon its first reflection at $M_2$ passes through the opening 10 of $M_1$ to fall on the mirror $M_4$. The tuned detector may however itself be located at $F_4$ to receive all of the light passed through the system. The detector may comprise a photocell followed by a tuned amplifier and a suitable indicating device, as shown.

In place of the plane mirrors 18 and 19, a spherical mirror may be used, preferably of long focus, positioned with its center of curvature on the axis Z—Z at the location along Z—Z of the focus $F_2$.

Figs. 2–6 illustrate an application of the invention to a monochromator in which a single dispersing element is employed to achieve the dispersion and the purity of spectrum of a double monochromator.

The conventional simple monochromator employs an entrance aperture or slit, a collimating lens or mirror, a dispersing prism or grating, a focusing lens or mirror (which may be the same mirror as that employed for collimation) and an exit aperture or slit. The band of wave lengths transmitted through the exit slit depends in the first instance on the width of the entrance and exit slits, and on the orientation of the dispersing element, and should contain only components of a continuous band of wave lengths. In fact however imperfections in the lenses and prisms and dust on their faces result both in false refractions and in multiple reflections which cast onto the exit slit small amounts of light of wave lengths outside the continuous band which is appropriate to the slit width and setting of the wave length selecting element. This unwanted stray light may be of high intensity compared to the desired narrow band of monochromatic light, and must be eliminated for certain uses.

To eliminate such transmitted stray light, it is common to add a second monochromator in series with the first. Since the only light permitted to pass through the entrance slit of this second monochromator is the monochromatic band produced by the first, with a small amount of transmitted stray light, the light emerging from the exit slit of the second monochromator will be of exceedingly high purity. The stray components produced by the first monochromator are refracted out of the way in passing through the second monochromator, since they lie outside the band of wave lengths which the second monochromator is adjusted to handle, and the stray transmitted components which are proper to the second monochromator are in themselves harmless since they comprise in general only light within the monochromatic band produced by the first.

Double monochromators of this known type are costly however since they include substantially all the elements of two single monochromators. The monochromator of Figs. 2 and 3 however, achieves with a single dispersing element and the focusing and collimating elements of a single monochromator the results of a double monochromator. In the instrument of Fig. 2, the light to be examined enters the monochromator through an entrance aperture or slit, is collimated and is then dispersed once by the dispersing element. A portion of the spectrum so produced, selected either by an intermediate aperture or by the finite size and appropriate shaping of a reflecting device provided for the purpose, is then returned by that reflecting device through the dispersing element for a second dispersion. Part of the spectrum so further dispersed is selected by an exit aperture and emerges from the instrument for use.

The second pass of the radiation through the dispersing element effectively eliminates the transmitted stray light produced by the first pass as does the second dispersing system of the conventional cascade instrument. Because however of reflections at the faces of the collimator element and because of other large-angle scattering, as for example at the faces of the dispersing element, the radiation which is sent back through the dispersing element to emerge at the exit aperture arrives there mixed with reflected stray light whose deleterious effect may be of the same order of magnitude as the transmitted stray light of the conventional single monochromator.

To eliminate the effect of the reflected stray light, there is provided in the instrument of Fig. 2 a light chopper interposed in the optical path between the two passes made by the light through the dispersing system, and a detector is provided at the output which responds to light modulated by the chopper but which does not respond to light which has not been modulated by the chopper. The chopper is preferably located beyond the intermediate aperture or other wave length selecting means interposed between the two passes through the dispersing element, or else it is itself made to be nonreflecting. In the first case, only approximately monochromatic light is chopped, the only light improperly chopped being the small stray light component customarily found for example in the exit slit of a standard single monochromator. In the second case, the improperly chopped light includes in addition light of other wave lengths, but this light of other wave lengths is eliminated by the wave length selection between the two passes through the instrument. In either case the second pass through the dispersing element filters out the improperly chopped component of stray light within the portion of the spectrum passed by the wave length selecting element.

Measurements with an instrument constructed according to my invention are entirely free from the effects of stray light. For example, I find that, with the monochromator of Fig. 2, measurements of the transmission coefficients of transmittance of the rare earth glass filters may be made down to coefficients of the order of 0.005% in the center of their few narrow absorption bands, all in the presence of the major part of the incident light, which the filters transmit.

In Fig. 2 a source 105 is arranged to generate light including components in the narrow band of wave lengths which it is desired to isolate and measure. The source 105 is preferably operated at substantially constant intensity. A tungsten filament lamp heated by direct current provides a suitable source for many applications. The light from the source 105 is concentrated by a condenser lens 107 to fall upon the upper portion of a slit after deviation by the right angle reflecting prism 109. The upper portion of the slit 111 therefore serves as entrance slit to the instrument. The source may be surrounded by a hood 106 which minimizes the direct illumination of the detecting element 130 by the source. A suitable frame, not shown, supports the prism 109 and slit 111 in proper relation, as well as the lens 115 and dispersing element 117, and other elements of the monochromator to be presently described.

Inside the monochromator, which may be enclosed within a housing not shown, the entering light passes through a lens 115, which renders it parallel for incidence on the dispersing prism 117. In an embodiment of the invention which has been successfully operated, the lenses 115 and 118 were of 300 mm. focal length. These lenses were located immediately adjacent the prism on either side thereof. On the far side of the prism, a second lens 118 focuses the dispersed spectrum of the incident light across the lower portion of an intermediate slit 120. The wave length of the light which is passed through the slit 120, and which after a second passage through the prism emerges from the lower portion of the slit 111 for use, depends upon the relative orientation of the prism 117 and the lenses 115 and 118. This wave length may be conveniently varied by rotating the prism 117 with respect to the frame about a vertical axis, although other arrangements known to the art may be used for this purpose.

Beyond the slit 120 there is provided a concave mirror 122. The mirror 122 is arranged to collect the light diverging from the lower portion of the slit 120 and to refocus it on the upper portion of that slit for its return passage through the dispersing element in the opposite direction. The mirror 122 may advantageously have a spherical surface disposed with its center of curvature in the plane of the slit 120 and having its axis substantially coincident with the optical axis of the lens 118. In the embodiment above referred to including lenses 115 and 118 of 300 mm. focal length the mirror 122 had a radius of curvature of 150 mm.

Between the slit 120 and the mirror 122 there is arranged a light chopper which may be of any suitable and usual form, adapted to interrupt or modulate the beam emerging from and returning to the slit 120 at a suitable rate. The rate may be varied over wide limits, provided only that the detector hereinafter to be described discriminates against light from the source which has not been modulated in intensity by the chopper.

Thus with a source operated at constant intensity the chopping rate may be as low as 10 C. P. S. or as high as 10,000 C. P. S. or more, it being required only that the chopping rate be sufficiently high to permit the detector to respond to light modulated at the chopping rate without responding to light of constant intensity. If the source is itself modulated in intensity, the chopping rate must be made sufficiently different from the rate of modulation of the source for the detector to be able to respond to the chopped light although designed to be insensitive to light modulated at the rate of modulation of the source. With a constant intensity source, a chopping frequency of 90 C. P. S. has proved satisfactory for operation with a photocell detecting element.

As shown in Fig. 2, the light chopper may consist of a disk 125 having alternate opaque and transparent sectors 126 and 127. The disk 125 is driven by a motor 129 and is mounted so that it will interrupt periodically the beam emerging from the slit 120.

The light returned by the reflector 122 passes through the upper portion of the slit 120 and passes again through the dispersing prism 117 to emerge through the lower portion of the slit 111.

A condenser lens 128 focuses onto a detecting element 130 such as a photo tube the chopped and doubly purified emerging light, together with a certain amount of stray light such as light reflected from the faces of the lens 115 and from the adjacent face of the prism 117. The detector also includes an indicating element or meter 132 for measuring the output of the photo tube. The meter 132 may take the form of an A. C. vacuum tube voltmeter designed to respond only to signals whose intensity has been modulated at a rate other than the rate of modulation of the source, if any. Thus with a constant intensity source, by using as a meter a vacuum tube voltmeter responsive over a wide range of frequencies, the light may be chopped at any frequency within the range of sensitivity of the meter and a response will be obtained which excludes the effect of unmodulated light. If desired a suitable amplifier can be interposed between detecting element 130 and 132. The amplifier should be designed to handle all frequencies produced by the chopper, if it is contemplated that the chopper will be operated at varying speeds.

Since the meter 132 responds only to modulated light, i. e. to light which has been chopped, it is apparent that the stray light which may be reflected out the slit 111 due to reflections at the lens 115 and other elements such as the slit 111 itself, will not contribute to the reading on the meter, since such stray light has not been modulated by the chopping disk 125.

Suitable forms of entrance and exit slit structure for use in the monochromator of Figs. 2 and 3 are shown in Figs. 4, 5 and 6. In Fig. 4, two jaws 140 and 142 are employed to define the edges of both the entrance and exit slits. In Fig. 5 the entrance and exit slit portions defined by a single pair of jaws are separated by a barrier 144, while in Fig. 6 the entrance slit is defined by jaws 146 and 148 while the exit slit is defined by jaws 150 and 152.

Of course the monochromator of Figs. 2 and 3 may be constructed with entrance and exit apertures or slits disposed side by side instead of in over and under or collinear relation as shown. With a side-by-side disposition however the intermediate aperture, if employed, must be very wide. No such aperture is necessary however since the wave length selecting function thereof may be performed either by a corner reflector disposed at the focus of the focusing element (for the first pass) as in the absorption cell of Fig. 1 or by vignetting effected by a concave reflecting means such as the mirror 122 of Fig. 2 in conjunction with the lens 118 which serves as collimating element for the second pass of the light through the dispersing element.

Fig. 7 illustrates another embodiment of the invention as applied to a monochromator, in which the entrance and exit slits are disposed side by side. In the monochromator of Fig. 7 spherical or paraboloidal mirrors 86 and 90 are employed as collimating and focusing elements, in connection with a dispersing prism 78 and a spherical mirror 92, the latter of which serves as a reflecting element to return for a second pass through the system light of a band of wave lengths selected on the first pass. The mirrors 86 and 90 function also as imaging elements to image a source 80 at an intermediate focus $F_1$ after one passage through the instrument and to image an intermediate source $F_2$ at the exit slit 96 of the instrument after a second pass through the instrument. Of course, each of the mirrors 86 and 90 is an imaging element by itself, presenting at infinity an image of the light source at its focus.

An entrance slit 80 defines a source for the instrument, from which a diverging bundle G is reflected at a plane mirror 82 onto the mirror 86. Along the path of the light rays, the slit 80 is at the focal distance from mirror 86 so that the bundle G is transformed into a parallel bundle H, which is thrown onto the prism 78 by a plane mirror 84, having an opening at 85 to accommodate the entering and the finally emerging beams of the instrument. Bundle H is dispersed by the prism 78 into a plurality of monochromatic parallel bundles. Of these, only those of a restricted range of wave lengths, dependent on the width of the opening 89 in a second plane mirror 88, suffer such reflection at the mirror 88 as to be transformed by the spherical mirror 90 into convergent bundles which pass through the opening 89. Of the bundles which get through the opening 89 a still smaller number, dependent on the width of the final exit slit 96, are so reflected by the returning mirror 92 as to be passed back through the instrument to emerge at the exit slit.

The mirror 92 is of one-half the focal length of the mirror 90, and is positioned with its center of curvature on the focal surface of the mirror 90.

In Fig. 7 the exit slit 96 is shown as being of very narrow width, so that of the monochromatic bundles produced by dispersion of the bundle H in prism 78, only a single bundle H′ passes twice through the instrument to emerge at the exit slit. The bundle H′ is reflected at the mirror 88 and is focused by the mirror 90 to an intermediate focus at $F_1$. The light diverging from $F_1$ is refocused by mirror 92 at $F_2$ from where it passes to the spherical mirror 90 to assume the form of the parallel bundle H″, containing light of the same wave lengths as bundle H′, but modulated by the chopper 102. The bundle H″ is reflected a second time at the mirror 88 onto the prism where it undergoes a second refraction, emerging as the bundle J. After reflection at the mirror 84 the bundle J is focused by the mirror 86 at the exit slit 96. The light passing through the exit slit is then converged by a mirror 98 on a detector 100 such as a thermocouple.

A motor driven chopper 102, preferably nonreflecting on the side presented to mirror 90, is positioned to interrupt periodically the passage of light between the mirrors 90 and 92, preferably on the side of the mirror 88 adjacent the mirror 92 as shown, and the detector 100 is connected to an amplifier 104 tuned to the rate of the chopper 102. Elements 102 and 104 thus act together as a tuned detector.

By this means, the response of the instrument is protected from spurious effects due to the return of white light out the exit slit upon its initial reflection at mirror 86, or at mirrors 84, 88 and 90. It is also protected against large-angle scattered white light which may be returned from the front face of the prism 78 or from imperfections in the prism. The instrument is also protected by the chopper from light of undesired wave lengths which on its first pass through the prism is so refracted that it is directed by the mirror 90 to strike the mirror 88 instead of passing through the opening 89 therein and which may therefore be sent through the prism for a second dispersion without undergoing modulation by the chopper 102.

The finite width of the opening 89 in mirror 88 therefore effects a wave length selection of the light subjected to chopping, and the instrument functions as a true double monochromator, having not only the double dispersion of the Littrow type instrument in which the dispersing element is used twice, but also the purity of the instrument including two dispersing elements in series, with a slit between them.

Selection of the wave length or wave lengths to be viewed by the instrument is effected by rotation of the mirrors 84 and 88 in opposite directions about axes perpendicular to the plane of Fig. 2. This may be achieved by mechanical linkage of conventional type connecting the two mirrors together.

In the embodiment shown in Fig. 7, the mirror 92 is conjugate in the mirror 90 to the prism 78, and the entrance and exit slits are similarly conjugate to the prism in the mirror 86. With this construction the prism 78 acts as the stop of the instrument. In one form of construction according to the invention the mirrors 86 and 90 are moreover so positioned that the path from each thereof to the prism is twice its focal length.

Of course a diffraction grating may be employed in place of the prism shown by suitably reorienting the remaining elements of the system.

Even if the opening 89 in the plane mirror 88 were of excessive size, a wave length selection would still be achieved because the bundles of wave lengths too far removed in the spectrum on either side from the wave length whose foci $F_1$ and $F_2$ are symmetrically positioned about the center of curvature of mirror 92 will be partly or wholly lost off the edge of mirror 92 or, being returned by mirror 92 will be partly or wholly lost off the edge of mirror 90. Similarly, by reducing the radius of curvature of mirror 92, while keeping its center of curvature on the focal surface of the imaging element 90, and while repositioning the prism 78 with respect to mirrors 88 and 90 as necessary to preserve the conjugate relation of the prism and of the mirror 92 in mirror 90, an increasingly sharp wave length selection of the light returned to the prism for a second dispersion will be achieved independently of the size of the opening 89, since bundles of other wave lengths than that of H' will be wholly or partly lost off the mirror 90 by vignetting.

In the embodiment of Fig. 7, the entrance and exit slits are "side by side," i. e. they are similarly disposed with respect to planes parallel to the principal sections of the prism or perpendicular to the rulings of the diffraction gratings. A monochromator of the general form of Fig. 7 may of course however be embodied in an instrument in which the entrance and exit slits are disposed "over and under," i. e. one above and the other below such a plane.

I claim:

1. An image-forming optical instrument comprising means to define a light source, image-forming means positioned to receive light from the source, reflecting means positioned to return to the image-forming means light from the source imaged by the image-forming means, means to interrupt at a periodic rate other than the rate of modulation of said source the passage of light over the path extending from the image-forming means to the reflecting means and back to the image-forming means, and a detector positioned adjacent an image of the source as formed successively by the image-forming means, reflecting means and image-forming means, said detector being responsive to light modulated at said periodic rate and unresponsive to light modulated at the rate of modulation of said source.

2. An optical instrument comprising means to define a light source, imaging means positioned to receive light diverging from said source, light-reflecting means positioned to return to the imaging means light passing from the source to the imaging means, means to interrupt at a periodic rate the passage of light over the path extending from the imaging means to the reflecting means and back to the imaging means, an exit slit positioned at an image of said source successively formed by said imaging means, reflecting means and imaging means, and a light sensitive detector disposed adjacent said exit slit, said detector being sensitive to light modulated at said periodic rate.

3. An optical instrument comprising image-forming means, means to define a localized source of light adjacent a focal surface of said image-forming means, a corner reflector positioned adjacent an image of said source in said image-forming means, means to define an exit aperture at a position conjugate to the image in said image-forming means of said image of said source, means to interrupt at a periodic rate the passage of light over the path extending from said image-forming means to said corner reflector and back to said image-forming means, and a detector sensitive substantially only to light modulated at said periodic rate, said detector being positioned to receive light from said source as twice imaged in said image-forming means and passed through said exit aperture.

4. An absorption cell comprising a light source, a first concave mirror having a hole in it, means to pass light diverging from the source through the hole in the first mirror, a second concave mirror having a hole in it, the second mirror being supported coaxially of the first mirror in position to transform into a cylindrical bundle light from the source passing through the hole in the first mirror, specularly reflecting means positioned beyond the second mirror in position to return to the first mirror light from the source as successively imaged by the first and second mirrors, means to interrupt at a periodic rate the passage of light between the first mirror and the reflecting means, and means including a detector sensitive to light modulated at said rate disposed in position to receive light from the source as successively imaged by the first mirror, reflecting means and second mirror.

5. A monochromator comprising means to define a localized light source, an image-forming element, said means being positioned to place said source virtually close to but exteriorly of the axis of symmetry of said imaging element adjacent a focus thereof, a dispersing element, means including said imaging element adapted to cast onto said dispersing element a beam of substantially parallel light derived from said source by said imaging element, reflecting means positioned to receive a portion of the light dispersed by said dispersing element and to return it to said dispersing element for a second dispersion, and means to interrupt at a periodic rate the passage of light between said imaging element and said reflecting element in its progress over the path extending from said imaging element through said dispersing element to said reflecting element, back to said dispersing element and to said imaging element.

6. A monochromator comprising an entrance slit; image-forming means; a light dispersing element; means including said image-forming means positioned to receive light from said slit, to transform it into a substantially parallel bundle, and to cast said parallel bundle onto said element; means including a reflecting element positioned to receive a portion of the light dispersed by said dispersing element and to return it to said dispersing element for a second dispersion; an exit slit; means to interrupt at a periodic rate the passage of light from said dispersing element to said light-reflecting element and back to said dispersing element; and a light sensitive detector adjacent said exit slit responsive only to light modulated at said periodic rate.

7. A monochromator comprising means to define a localized source of light, image-forming means, means including said image-forming means positioned to receive light from said source and to transform it into a substantially parallel bundle, a light-dispersing element positioned to receive said parallel bundle, means including a reflecting element positioned to receive a portion of the light dispersed by said dispersing element and to return it to said dispersing element for an additional dispersion, and means to interrupt at a periodic rate the passage of light from said dispersing element to said light-reflecting element and back to said dispersing element.

8. A monochromator comprising a dispersing element, a first slit and a second slit disposed on opposite sides of the dispersing element, separate collimating and focusing means disposed between the dispersing element and each of said slits, a reflector disposed beyond the second slit in position to return to the second slit light passing from the first slit through the dispersing element and through the second slit, a light interrupting device interposed between the second slit and reflector, the light interrupting device being adapted to interrupt the passage of light between the second slit and the reflector at a periodic rate, and a light sensitive detecting device disposed adjacent the first slit in position to be illuminated by light emerging from the first slit, the light sensitive device being adapted to respond only to light interrupted by the light interrupting device.

9. A monochromator comprising a first slit, a first lens adapted to render parallel the light passing through the first slit, a dispersing element, a second slit, a second lens adapted to focus light from the dispersing element upon the second slit, a reflector adapted to return to the second slit light emerging therefrom, a light chopper interposed in the optical path between the second slit and reflector, and a detecting device disposed in front of the first slit, the detecting device being sensitive to light modulated at the chopping frequency and insensitive to unmodulated light.

10. A monochromator comprising a source of light of substantially constant intensity, a first slit, means to illuminate the first slit with light from the said source, a first lens adapted to render parallel the light passing through the first slit, a dispersing element, a second slit, a second lens adapted to focus on the second slit a portion of the dispersed spectrum of light produced by the dispersing element, a concave spherical mirror disposed beyond the second slit in position to return to the second slit the light emerging therefrom, light interrupting means adapted to interrupt at a periodic rate the transmission of light between the second slit and the spherical mirror, and a light sensitive detecting and indicating element disposed in position to be illuminated by light returning from the second slit through the dispersing element and through the first slit, said detecting element being sensitive to light modulated at the said periodic rate and being insensitive to light of constant intensity, said concave spherical mirror having its center of curvature in the plane of the second slit and its axis substantially coaxial with the axis of the second lens.

11. A monochromator comprising a source of light modulated at a first frequency, a first slit, means to illuminate the first slit with light from the said source, a first lens adapted to render parallel the light passing through the first slit, a dispersing element, a second slit, a second lens adapted to focus on the second slit a portion of the dispersed spectrum of light produced by the dispersing element, a concave spherical mirror disposed beyond the second slit in position to return to the second slit the light emerging therefrom, light interrupting means adapted to interrupt at a second frequency the transmission of light between the second slit and the spherical mirror, and a light sensitive detecting and indicating element disposed in position to be illuminated by light returning from the second slit through the dispersing element and through the first slit, said detecting element being sensitive to light modulated at the said second frequency and insensitive to light modulated at the said first frequency, said concave spherical mirror having its center of curvature in the plane of the second slit and its axis substantially coaxial with the axis of the second lens.

12. A monochromator comprising a source of light of substantially constant intensity, a first slit arranged to be illuminated by light from the said source, a first lens adapted to render parallel the light passing through the first slit, a dispersing element, a second slit, a second lens adapted to focus across the second slit the dispersed spectrum of light produced by the dispersing element, a concave spherical mirror disposed beyond the second slit in position to return to the second slit the light emerging therefrom, light interrupting means adapted to interrupt at a periodic rate the transmission of light between the second slit and the spherical mirror, and a light sensitive detecting and indicating device disposed in position to be illuminated by light returning from the second slit through the dispersing element and through the first slit, said device being sensitive to light modulated at the said periodic rate and insensitive to light of constant intensity, said concave spherical mirror having its center of curvature in the plane of the second slit and its axis substantially coaxial with the axis of the second lens.

13. A monochromator comprising a first slit, a first lens, a dispersing element, a second lens, a second slit, a concave spherical mirror disposed beyond the second slit in position to return thereto light emerging therefrom, said spherical mirror having its center of curvature disposed substantially in the plane of the second slit and having its axis substantially coincident with the axis of the second lens, a light interrupting means adapted to interrupt at a periodic rate the transmission of light between the second slit and the spherical mirror, and a light sensitive detecting and indicating device disposed in position to be illuminated by light returning from the second slit through the dispersing element and through the first slit, said device being sensitive only to light modulated at the said periodic rate.

14. A monochromator comprising a first slit, a first lens adapted to render parallel the light passing through the first slit, a dispersing element, a second slit, a second lens adapted to focus across the second slit the dispersed spectrum of light produced by the dispersing element, a concave mirror disposed beyond the second slit in position to return to the second slit the light emerging therefrom, light interrupting means adapted to interrupt at a periodic rate the transmission of light between the second slit and the concave mirror, and a light sensitive detecting and indicating device disposed in position to be illuminated by light returning from the second slit through the dispersing element and through the first slit, said device being sensitive only to light modulated at said periodic rate.

15. A monochromator comprising a first slit, a dispersing element, a second slit, separate collimating and focusing means disposed between the dispersing element and each of said slits, a concave mirror disposed beyond the second slit in position to return thereto light emerging therefrom, light interrupting means adapted to interrupt at a periodic rate the transmission of light between the second slit and the mirror, and a light sensitive detecting and indicating device disposed in position to be illuminated by light returning from the second slit through the dispersing element and through the first slit, said device being sensitive only to light modulated at the said periodic rate.

16. A monochromator comprising: a light dispersing means; collimating and focusing elements disposed on opposite sides of said dispersing means; a first slit positioned on one side of said dispersing means beyond one of said elements; a second slit disposed on the other side of said dispersing means beyond the other of said elements; a mirror disposed in the path of light passing from said first slit through said collimating element, dispersing means, focusing element and second slit in succession in position to return said light to said dispersing means and collimating and focusing elements in the reverse order; a light interrupting means disposed in position to interrupt at a periodic rate the passage of light between said dispersing means, second slit and dispersing means; and a light sensitive detecting device disposed on the side of the dispersing means opposite said interrupting means in position to receive light returned from said mirror through said dispersing means, said detecting device being sensitive only to light modulated at said periodic rate.

17. A spectrometric instrument comprising collimating and focusing means; means defining a localized light source located adjacent a focal surface of said collimating and focusing means; a dispersing element positioned to receive light from said source as collimated by said collimating and focusing means; specular light reflecting means positioned to return to said collimating and focusing means a portion of the light from said source as collimated by said collimating and focusing means, dispersed by said dispersing element and focused by said collimating and focusing means; an exit slit located adjacent a focal surface of said collimating and focusing means in position to intercept a portion of the light so returned after a second collimation, dispersion and focusing by said collimating and focusing means and dispersing element; and means to interrupt at a periodic rate the passage of light between said collimating and focusing means and said reflecting means.

References Cited in the file of this patent

UNITED STATES PATENTS

| | | |
|---|---|---|
| 2,212,211 | Pfund | Aug. 20, 1940 |
| 2,378,930 | Kendall et al. | June 26, 1945 |
| 2,451,572 | Moore | Oct. 19, 1948 |
| 2,462,946 | Coggeshall et al. | Mar. 1, 1949 |
| 2,503,165 | Meyer | Apr. 4, 1950 |
| 2,562,181 | Frommer | July 31, 1951 |
| 2,605,671 | Canada | Aug. 5, 1952 |
| 2,652,742 | Walsh | Sept. 22, 1953 |